Aug. 2, 1938.  A. MATSUMAE  2,125,577

AUXILIARY MEDICAL AGENT AND METHOD OF PREPARING THE SAME

Filed Sept. 10, 1936

INVENTOR.

Akiyoshi Matsumae

Patented Aug. 2, 1938

2,125,577

UNITED STATES PATENT OFFICE 2,125,577

AUXILIARY MEDICAL AGENT AND METHOD OF PREPARING THE SAME

Akiyoshi Matsumae, Kumamoto, Japan

Application September 10, 1936, Serial No. 100,168

6 Claims. (Cl. 167—57)

My invention relates to improvements in a method of manufacturing an auxiliary agent for drinking medicines such as cod-liver oil, castor oil and other disgustful medicines, and its object is to provide an auxiliary medical agent which produces innumerable number of small bubbles of stable nature in water for facilitating the drinking of castor oil etc. without disgustful feeling.

Fatty medicines such as cod-liver oils, castor oils and the like as well as bitter powder medicines give disgustful feeling to patients. It is very desirous to provide some agent to cancel such disgustful odour or unpleasant taste and protect the medicine from adhering to the tongue or mouth. The present invention is to provide a very conveniently applicable agent for producing an innumerable number of small durable bubbles which envelope the medicine by the strong skin effect caused by the surface tension in order to attain the above mentioned object.

What I consider to be novel and my invention will be better understood by reference to the following description and appended claims when considered in connection with the accompanying drawing which illustrates the manner of using the auxiliary agent of this invention.

Figure 1:
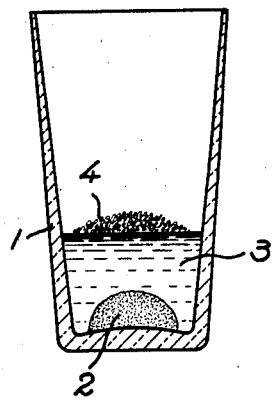
Figure 2:
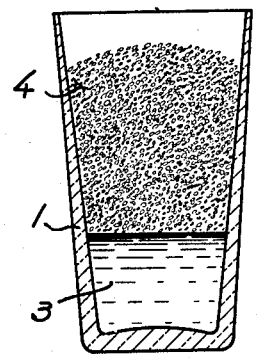
Figure 4:
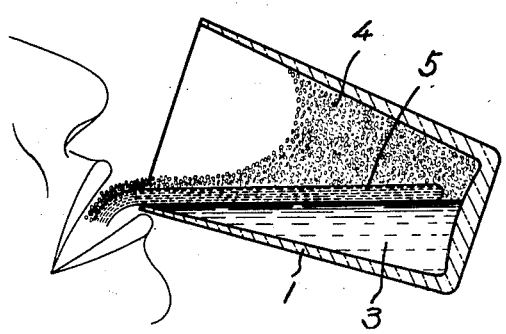
Figure 3:
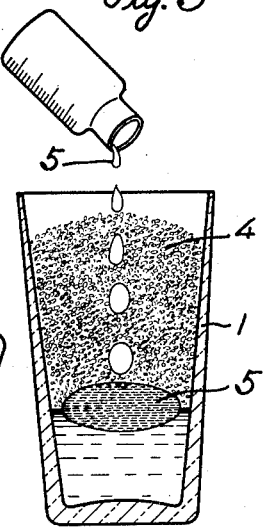

Fig. 1 is a sectional elevation of a cup containing a small amount of the powder prepared by the method of this invention with water poured therein; Fig. 2 is a sectional view similar to Fig. 1 illustrating the formation of bubbles; Fig. 3 is a similar sectional view for illustrating the manner of pouring castor oil; and Fig. 4 is also a sectional view for illustrating the manner of drinking the castor oil.

Stable bubbles of thick layer can be formed by mechanical means of violently shaking or stirring the adhesive liquid for a considerable time. But such means requires great labour and mechanical power. Similar bubbles can be formed by injecting air or gas into adhesive liquid and are maintained for a certain period, but such process needs some mechanical device for injecting air or gas.

In accordance with this invention the above described disadvantages can be avoided by forming stable fine bubbles very easily when desired. In carrying my invention into effect, powders of botanical adhesive agent soluble in water such as adhesive gum, saponin or colloidal adhesive material and the chemical agent which generates gas in water are well mixed together and made into sufficiently fine powders. As the colloidal adhesive agent, gum arabic, tragacanth gum, saponin and other colloidal adhesive substances may be used. Such an adhesive agent is mixed with an almost equal amount of sodium carbonate or bicarbonate and tartaric acid or citric acid or their mixture and ground into possibly fine powders. To mixed powder is also added a small quantity of lactose and some perfumes.

As an example the materials to be mixed together are taken according to the following proportions and made sufficiently fine powders:—

| | Parts |
|---|---|
| Gum arabic | 2 |
| Tartaric acid | 1 |
| Sodium bicarbonate | 1 |
| Flavouring | 1 |
| Perfume | Small quantity |

The powder of this invention may be reserved or sold as a liquid by putting a suitable quantity of the powder into the water contained in a bottle and then the bottle is quickly sealed before the bubbles are formed and the formation of bubbles is suppressed by the pressure created in the bottle.

In using the powder of this invention, a certain quantity of the powder 2 such as 0.5 to 2.0 grams is taken and put in a cup 1 as shown in Fig. 1 and about 15 to 30 grams of water is poured in the cup. Then the adhesive materials in the powder are quickly dissolved in water and the gas generating materials generate very fine gas bubbles corresponding to each particle of the fine powder so that the adhesive liquid is foamed and made into innumerable number of small bubbles. Thus the upper part of the cup 1 is filled with a thick layer of the bubbles 4 as shown in Fig. 2, remaining the water in the lower part of the cup and the bubbles encircled by the adhesive liquid are maintained for a pretty long time. This is probably due to the fact that the film of the adhesive liquid has a pretty strong surface tension which rather overcomes the pressure of an occluded gas bubble and has the tendency of contracting each bubble and the stability of foams or bubbles is maintained for a long period. In case of an ordinary lemonade or aerated water, the evolved gas bubbles have the tendency to unite together quickly so that the volume of a bubble is increased and the surface tension of the liquid film can no more balance with the gas pressure and the gas can be dispersed away by breaking the enveloping film. Accordingly the bubbles are extinguished momentarily in refreshing drinks.

After the stable fine bubbles are formed in the cup as shown in Fig. 2, the fatty medicine 5 such as castor oil or cod-liver oil is poured into the cup 1 as shown in Fig. 3. The medicine does neither mix with water nor disperse on water, but it accumulates as one mass floating on the water because the medicine is expelled by the surface tension of the liquid and bubbles caused by the tendency of decreasing the volume of each bubble. The medicine does not also adhere to the inside of the cup since the surface is protected by the thin film of aggregation of small bubbles. Then the medicine is drunk by inclining the cup as shown in Fig. 4, in which case the medicine is distinctly separated from water and bubbles by the difference of specific gravity and is protected by the skin film of stable bubbles without disgustful odour or taste. Since water gives fluidity for conveying the medicine 5 it can be easily drunk without sticking to the tongue or mouth and also the medicine does not adhere to the cup and no odour is left in the cup. This is due to the effect of stable small bubbles entirely covering the medicine so as not to stick to the other substances.

The auxiliary agent manufactured by the method of this invention is carried very conveniently and easy for use when required and is very effective to avoid disgustful odour.

I claim:—

1. A method of preparing an auxiliary medical agent to be used for the administration of oily and unpleasant tasting medicines, which comprises mixing an alkali metal compound of carbonic acid, an acid reacting substance which will set free carbon dioxide from the said compound when the mixture is added to water, a water soluble adhesive gum, a flavoring substance and a perfume, and finely grinding the mixture, the said mixture, upon the addition of water, yielding a pleasant tasting liquid, and a mass of lasting bubbles of carbon dioxide.

2. An auxiliary medical agent for disguising the taste of oily and unpleasant tasting medicines, which comprise a finely pulverized mixture of an alkali metal compound of carbonic acid, an acid reacting compound adapted to free carbon dioxide from said compound of carbonic acid, upon the addition of water, and a water-soluble adhesive vegetable gum.

3. The auxiliary medical agent of claim 2, to which has been added a flavoring compound and a perfume.

4. An auxiliary medical agent for disguising the taste of oily and unpleasant tasting medicines which comprises a finely divided mixture of sodium bicarbonate, citric acid, gum-arabic, sugar and a perfume.

5. The method of preparing castor oil for administration which comprises preparing a pleasant tasting fluid and a superposed mass of lasting bubbles of carbon dioxide, and pouring the oil through said bubble upon the surface of the liquid.

6. The process of imbibing oily and unpleasant tasting medicines which comprises placing said medicine upon a body of pleasant tasting liquid and beneath a mass of lasting bubbles of carbon dioxide and drinking the whole.

AKIYOSHI MATSUMAE.